UNITED STATES PATENT OFFICE.

NAPOLEON PETINOT, OF NEW YORK, N. Y., ASSIGNOR TO UNITED STATES FERRO-ALLOYS CORPORATION, OF NEW YORK, N. Y., A CORPORATION OF NEW YORK.

PROCESS FOR PRODUCING AN ALLOY OF ZIRCONIUM AND LEAD.

1,335,982.     Specification of Letters Patent.     Patented Apr. 6, 1920.

No Drawing.     Application filed August 18, 1919. Serial No. 318,323.

*To all whom it may concern:*

Be it known that I, NAPOLEON PETINOT, a citizen of the United States of America, residing in the city of New York, county of New York, and State of New York, have invented certain new and useful Improvements in Processes for Producing an Alloy of Zirconium and Lead, of which the following is a full, clear, and exact description.

The object of this invention is to make an alloy of lead and zirconium without volatilizing too large an amount of lead during the process. The work must be carried on in an electric furnace and owing to the high temperature involved in the reduction of the zirconium the lead is apt to be volatilized.

In carrying out the invention an electric furnace preferably of the Siemens type is used. The lining of such a furnace is composed of a highly refractory material, such, for instance, as oxid of zirconium. In order to avoid volatilization the voltage should not be over fifty volts. The furnace is partly filled with a bath of molten lead or the lead is melted in the furnace so as to form a molten bath. Then a mixture of zirconium oxid or an ore that is substantially an oxid of zirconium is mixed with burnt lime in such proportions that when melted together a calcium zirconate corresponding to the formula $CaZrO_3$ is formed. The amount of this mixture charged into the furnace is such that the zirconium content represents the weight which it is desired to introduce into the lead bath in order to make an alloy of the predetermined composition.

While this is the preferable method of working it may sometimes be desirable to prepare the calcium zirconate ($CaZrO_3$) separately and crush the fused mass after cooling to a small size before charging in the furnace. The temperature of the charge being raised gradually, metallic zirconium is formed and absorbed by the bath of lead.

Whichever method is used the material before charging is mixed with more than sufficient carbonaceous material such as charcoal, or coke, or petroleum coke, or anthracite coal or metallurgical coke to supply the carbon necessary to carry out the following reaction:

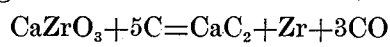

$$CaZrO_3 + 5C = CaC_2 + Zr + 3CO$$

In other words the amount of carbon used is sufficient to reduce the zirconia to zirconium and to form calcium carbid.

Having thus described my invention, what I claim is:

1. The process of producing an alloy of zirconium and lead comprising the melting of lead in a furnace so that it forms a molten bath, then melting together a mixture of zirconium oxid and burnt lime in such proportions that a calcium zirconate ($CaZrO_3$) is formed, then adding to the mixture sufficient carbon to reduce zirconium oxid to zirconium and to form calcium carbid, then charging the mixture into the lead bath whereby the metallic zirconium is absorbed by the lead bath.

2. The process of producing an alloy of zirconium and lead comprising the melting of lead in a furnace so that it forms a molten bath, then melting together a mixture of an ore that is substantially an oxid of zirconium and burnt lime in such proportions that a calcium zirconate ($CaZrO_3$) is formed, then adding to the mixture sufficient carbon to reduce zirconium oxid to zirconium and to form calcium carbid, then charging the mixture into the lead bath whereby the metallic zirconium is absorbed by the lead bath.

3. The process of producing an alloy of zirconium and lead comprising the melting of lead in a furnace so that it forms a molten bath, then melting together a mixture of zirconium oxid and burnt lime in such proportions that a calcium zirconate ($CaZrO_3$) is formed and in such an amount that the zirconium content represents the weight which it is desired to use to make an alloy of the predetermined composition, then adding to the mixture sufficient carbon to reduce zirconium oxid to zirconium and to form calcium carbid, then charging the mixture into the lead bath whereby the metallic zirconium is absorbed by the lead bath.

4. The process of producing an alloy of zirconium and lead comprising the melting of lead in a furnace so that it forms a molten bath, then melting together a mixture of zirconium oxid and burnt lime in such proportions that a calcium zirconate ($CaZrO_3$) is formed, then cooling the mixture and crushing the fused mass to a small size.

5. The process of producing an alloy of zirconium and lead comprising the melting of lead in a furnace so that it forms a molten bath, then melting together a mixture of zirconium oxid and burnt lime in such proportions that a calcium zirconate ($CaZrO_3$) is formed, then adding to the mixture more than sufficient carbonaceous material to reduce zirconium oxid to zirconium and to form calcium carbid, then charging the mixture into the lead bath whereby the metallic zirconium is absorbed by the lead bath.

6. As a new article of manufacture, an alloy composed of zirconium and lead.

In testimony whereof, I have hereunto signed my name.

NAPOLEON PETINOT.